US011880251B2

(12) United States Patent
Lu

(10) Patent No.: US 11,880,251 B2
(45) Date of Patent: Jan. 23, 2024

(54) SELF-POWERED INDICATOR

(71) Applicant: Samsung Electronics Co., Ltd., Suwon-si (KR)

(72) Inventor: Huajun Lu, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 242 days.

(21) Appl. No.: 17/173,026

(22) Filed: Feb. 10, 2021

(65) Prior Publication Data

US 2021/0165474 A1 Jun. 3, 2021

Related U.S. Application Data

(63) Continuation of application No. 15/812,921, filed on Nov. 14, 2017, now abandoned.

(60) Provisional application No. 62/555,713, filed on Sep. 8, 2017.

(51) Int. Cl.

| | |
|---|---|
| ***G06F 1/26*** | (2006.01) |
| ***G06F 1/32*** | (2019.01) |
| ***G06F 11/32*** | (2006.01) |
| ***G06F 1/30*** | (2006.01) |
| ***G06F 1/3225*** | (2019.01) |
| ***G06F 1/3287*** | (2019.01) |

(52) U.S. Cl.

CPC .............. *G06F 1/263* (2013.01); *G06F 1/266* (2013.01); *G06F 1/305* (2013.01); *G06F 1/3225* (2013.01); *G06F 1/3287* (2013.01); *G06F 11/326* (2013.01)

(58) Field of Classification Search

None

See application file for complete search history.

(56) References Cited

U.S. PATENT DOCUMENTS

| | | | | |
|---|---|---|---|---|
| 9,500,682 | B1 | 11/2016 | Morales et al. | |
| 2003/0197619 | A1 | 10/2003 | Awrence et al. | |
| 2006/0022805 | A1 * | 2/2006 | Yanagi | G06F 1/30 340/146.2 |
| 2007/0186120 | A1 | 8/2007 | Yasuo et al. | |
| 2010/0053339 | A1 | 3/2010 | Aaron et al. | |

(Continued)

FOREIGN PATENT DOCUMENTS

| | | |
|---|---|---|
| JP | 20170010356 | 1/2017 |
| KR | 19960042299 | 12/1996 |
| KR | 20080073111 | 8/2008 |

*Primary Examiner* — Fahmida Rahman

(74) *Attorney, Agent, or Firm* — Lewis Roca Rothgerber Christie LLP

(57) ABSTRACT

A rack-mountable computer system includes: a power supply unit comprising a power storage module and a power switch module; a controller configured to generate a signal indicating status information of the rack-mountable computer system; an indicator configured to indicate the status information of the rack-mountable computer system; and a signal latch module. The power supply unit switches a power supply of the indicator from the external power supply unit to the power supply unit in a power loss event when the rack-mountable computer system is detached from a rack or a system power of the rack is lost from an external power supply unit and supplies power to the indicator after the power loss event occurs. The signal latch module is configured to latch the signal that is generated by the controller and indicates the status information of the rack-mountable computer system in response to the power loss event.

18 Claims, 3 Drawing Sheets

External PSU 250
Power Connector 211
Computer System 200
Power Supply Unit 220
Power Storage Module 221
Power Switch Module 222
Data Storage Device 216
Controller 215
Signal Latch Module 223
Indicator 212
Server Tray 201
System Power Off Signal 224

(56) References Cited

U.S. PATENT DOCUMENTS

2014/0122922 A1* 5/2014 Hunt .................... G06F 11/073
714/E11.023
2014/0359377 A1 12/2014 Huang
2015/0154841 A1* 6/2015 Barnes ............... G08B 13/2428
340/572.1
2018/0089982 A1 3/2018 Cheng et al.

* cited by examiner

SELF-POWERED INDICATOR

CROSS-REFERENCE TO RELATED APPLICATION(S)

This application is a continuation application of U.S. patent application Ser. No. 15/812,921 filed Nov. 14, 2017, which claims the benefits of and priority to U.S. Provisional Patent Application Ser. No. 62/555,713 filed Sep. 8, 2017, the disclosures of which are incorporated herein by reference in their entirety.

TECHNICAL FIELD

The present disclosure relates generally to a rack-mountable computer system, more particularly, to a computer system and method for providing a self-powered indicator for indicating status information of the computer system.

BACKGROUND

Recent advancements in memory designs and manufacturing processes have achieved high densities in the storage capacity of a data storage device such as a solid-state drive (SSD) including a nonvolatile memory. Further, a single data storage server can have tens to hundreds of data storage devices attached thereto. When an error or a failure of a data storage device in the data storage server is detected, an administrator of the storage server can identify and replace the failed data storage device using a failure indicator.

A conventional data storage system requires the system power to power the failure indicator associated with the failed data storage device. Once the system power is off or lost, or a server tray including the failed data storage device is removed from the server rack, the indicator of the failed data storage device would lose its power because the indicator is powered by the system power provided from the server rack. This is problematic when the server rack including the failed data storage device is pulled out from the server rack in order to access the failed data storage device for servicing or replacement.

SUMMARY

According to one embodiment, a rack-mountable computer system includes: a power supply unit comprising a power storage module and a power switch module; a controller configured to generate a signal indicating status information of the rack-mountable computer system; an indicator configured to indicate the status information of the rack-mountable computer system; and a signal latch module. The power supply unit switches a power supply of the indicator from the external power supply unit to the power supply unit in a power loss event when the rack-mountable computer system is detached from a rack or a system power of the rack is lost from an external power supply unit and supplies power to the indicator after the power loss event occurs. The signal latch module is configured to latch the signal that is generated by the controller and indicates the status information of the rack-mountable computer system in response to the power loss event.

According to another embodiment, a method includes: providing an internal power supply unit of a computer system; detecting a power loss event of the computer system the computer system is detached from a rack or a system power of the rack is lost from an external power supply unit; switching a power supply of an indicator from the external power supply unit to the internal power supply unit and latching a status signal generated by a controller of the computer system after the power loss event occurs.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
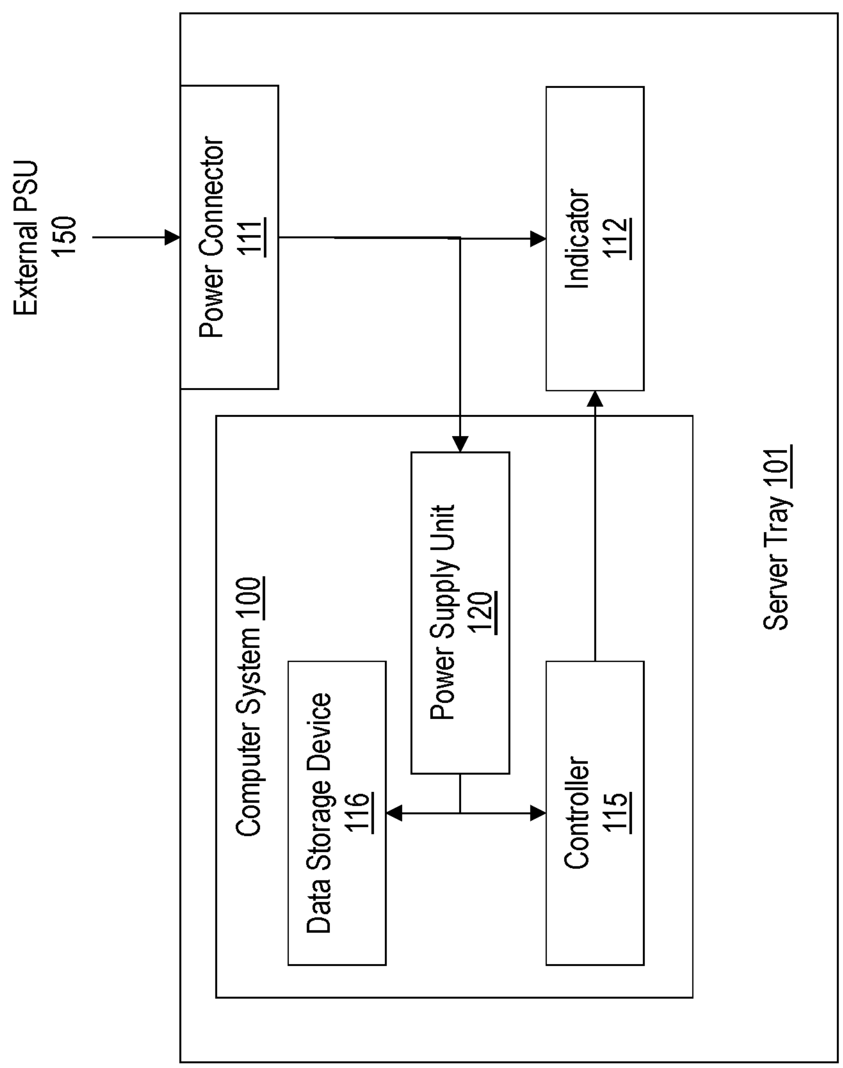
FIG. 1 illustrates a configuration of a prior art server tray.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a self-powered indicator for indicating status information of a computer system. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure is directed to a computer system including a self-powered indicator. According to one embodiment, the computer system is a rack-mountable computer system, for example, a rack-mounted server. In another example, the computer system is a data storage device attached to a tray in the rack-mounted server. The rack-mountable computer system can include a chassis that is mountable in a rack, and an internal power supply unit (PSU) coupled to the chassis. The internal power supply unit of the rack-mountable computer system can include a power supply enclosure, a power supply module, and a power switch module. The power supply enclosure has a panel that faces outwardly from the chassis to connect the internal power supply unit to an external power supply unit. The self-powered indicator can indicate a status of the computer system using the internal power supply unit even when the system is powered off or the computer system is dismounted or disconnected from the rack. Using the self-powered indicator, one can identify the failed component, subsystem, or device for correct identification and replacement.

According to one embodiment, the internal power supply unit may be mechanically or electrically mounted on the computer system. Alternatively, the internal power supply unit may be provided in the form of one or more chips and may be mounted on a flexible printed circuit board (FPCB) to be connected to the computer system in a tape carrier package (TCP) manner. In addition, the internal power supply unit may be mounted on the computer system in a chip-on-glass (COG) manner.

As used herein, "computer system" includes any of various computer systems or components thereof. One example of a computer system is a rack-mounted server. In another example, a computer system is one of many data storage devices in a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In some embodiments, memory may include, but is not limited to, a computer-readable medium, such as a dynamic random-access memory (DRAM), a non-volatile memory such as a flash memory, a phase-change memory (PCM), a resistive RAM (ReRAM), and a magnetic RAM (MRAM), and a spin-transfer torque magnetic RAM (STT-MRAM). Alternatively, a compact disc-read only memory (CD-ROM), a magneto-optical disk (MOD), and/or a digital versatile disc (DVD) may also be used. In addition, additional input channels may include computer peripherals associated with an operator interface such as a mouse and a keyboard. Alternatively, other computer peripherals may also be used that may include, for example, a scanner. Furthermore, in some embodiments, additional output channels may include an operator interface monitor and/or a printer.

As used herein, "rack" refers to a container, frame, or other element or combination of elements that can contain or physically support one or more computer systems.

As used herein, "chassis" refers to a structure or element that supports another element or to which other elements can be mounted. A chassis may have any shape or construction, including a frame, a sheet, a plate, a box, a channel, or a combination thereof. A chassis for a computer system may support circuit board assemblies, power supply units, one or more data storage devices, fans, cables, and other components of the computer system. In the example of a server rack, a chassis may refer to the chassis of the server rack, or an individual chassis of a rack-mountable server tray within a larger rack chassis.

As used herein, "tray" refers to a structure or element for holding one or more data storage devices or a computer system such as a server. A tray can include one or more support portions that support the data storage devices (or the computer system) and one or more spacing portions that establish one or more air passages below the data storage devices (or the computer system) when the tray is installed in a computer system, for example, a rack or a chassis.

FIG. 1 illustrates a configuration of a prior art server tray. The server tray 101 includes a computer system 100, a power connector 111, and an indicator 112. The computer system 100 includes a power supply unit 120, a controller 115, and one or more data storage devices 116. In some embodiments, the computer system 100 may also include a baseboard for the computer system 100. In this case, the controller 115 may be a baseboard management controller (BMC) of the computer system 100.

The power supply unit 120 may receive power from an external power supply unit 150 of a server rack that is mounted to the chassis of the server rack and supply power to the components of the computer system 100 including the controller 115, the data storage device 116, the indicator 112, and any other subsystems, devices, and components that may be present in the computer system 100. According to one embodiment, the computer system 100 is mechanically attached to the server tray 101, and the server tray 101 is configured to be mounted on the server rack or the chassis of the server rack. The power connector 111 can be removably coupled to the external power supply unit 150. The power connector 111 may also be referred to as a hot plug connector. In some embodiments, the server tray 101 is 1 rack unit (1U) high, and the server rack is a 42U rack. However, it is understood that the configuration of the server tray 101 and the configuration of the server rack may vary depending on the application and system configuration without deviating from the scope of the present disclosure.

The indicator 112 indicates status information of the computer system 100. For example, the indicator 112 can be an LED that can emit green, red, and/or yellow color. The green color of the indicator 112 may indicate that the computer system 100 is in normal operational condition, and the red color of the indicator 112 may indicate a severe problem associated with the computer system 100 when the computer system 100 or any component of the computer system 100 suffers from a failure or is non-functional. The yellow color of the indicator 112 may indicate a non-serious problem associated with the computer system 100, for example, a communication bus problem with the main server. In some embodiments, the indicator 112 may indicate a variety of conditions of the computer system 100. For example, the indicator 112 may blink or include a digital display that may indicate more detailed conditions of the computer system 100 or subsystems, components, or devices included in the computer system 100. When the computer system 100 is primarily configured as a data storage system, the indicator 112 may indicate the status of the data storage device(s) 116 of the computer system 100. One skilled in the art will recognize that there are many potential alternative indicators, as well as configurations of the indicators.

When the server tray 101 can be dismounted or disconnected from the server rack (or the chassis of the server rack), or the server tray 101 is powered down, for example, by a power switch (not shown), the server tray 101 loses its connection to the external power unit 150, thus the indicator 112 loses its power to indicate a failed data storage module attached to the server tray 101. This is troublesome for an administrator or a service technician to correctly identify the failed computer system 100 (or an indicated component) when the server tray 101 on which the failed computer system 100 is attached to is disconnected or dismounted from the server rack for performing a service or to replace the failed component in the computer system 100, for example, the data storage device 116, with a replacement component.

Figure 2:
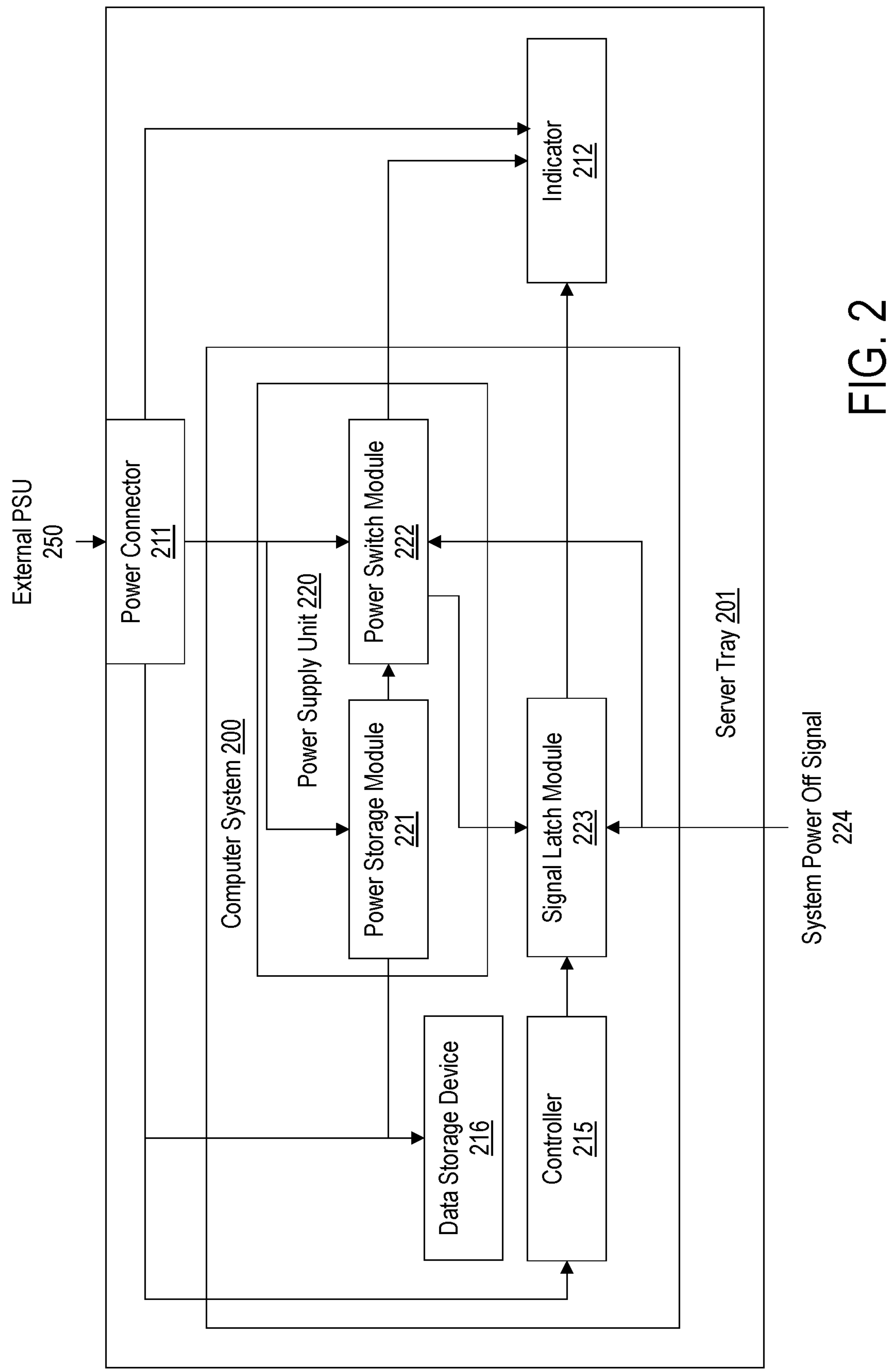
FIG. 2 illustrate a block diagram of an example server tray, according to one embodiment.

FIG. 2 illustrate a block diagram of an example server tray, according to one embodiment of the inventive principles. The server tray 201 includes a computer system 200, a power connector 211, and an indicator 212. The computer system 200 includes a power supply unit 220, a controller 215, and one or more data storage devices 216. The power supply unit 220 may receive power from an external power supply unit 250 of the server rack and supply power to the controller 215, the data storage device 216, the indicator 212, the latch module 223, and any other subsystems, devices, and components in the computer system 200. The controller 215 is configured to detect the power status of the computer system 200 and act accordingly. In one embodiment, the controller 215 may be a baseboard management controller (BMC). The BMC can monitor the physical state of the computer system 200 using various sensors, for example, a power status sensor.

According to one embodiment, the computer system 200 is attached to the server tray 201 that is configured to be mounted to a server rack. The power connector 211 can be removably coupled to the external power supply unit 250. The power connector 211 may also be referred to as a hot plug connector. In some embodiments, the server tray 201 is 1 rack unit (1U) high, and the server rack is a 42U rack. However, it is understood that the configuration of the server tray 201 and the configuration of the server rack may vary depending on the application and system configuration without deviating from the scope of the present disclosure.

According to one embodiment, the power supply unit 220 includes a power storage module 221 and a power switch module 222. The power storage module 221 includes a stand-alone power source such as a super capacitor, a battery, etc. When the server tray 201 is plugged into the server rack (or a chassis of the server rack), the power storage module 221 starts to charge using the power received from the external power supply unit 250 via the power connector 211. When the power storage module 221 is fully charged, the power storage module 221 may stop charging until the charge level goes below a predetermined level. When the charge level goes below a predetermined level, the power storage module 221 starts to charge again.

The indicator 212 indicates status information of the computer system 200 such as a failure or malfunctioning condition. The indicator 212 may include one or more light emitting diodes (LEDs). For example, the indicator 212 is an LED that can emit green, red, and/or yellow color. The green color of the indicator 212 may indicate that the computer system 200 is in normal operational condition, and the red color of the indicator 212 may indicate a severe problem associated with the computer system 200 when the computer system 200 or any component of the computer system 200 suffers from a failure or is non-functional. The yellow color of the indicator 212 may indicate a non-serious problem associated with the computer system 200, for example, a communication bus problem with the main server. In some embodiments, the indicator 212 may indicate a variety of conditions of the computer system 200. For example, the indicator 212 may blink or include a digital display that may indicate more detailed condition of the computer system 200 or subsystem, components, or devices included in the computer system 200. When the computer system 200 is primarily configured as a data storage system, the indicator 212 may indicate the status of the data storage device(s) 216 of the computer system 200. One skilled in the art will recognize that there are many potential alternative indicators, as well as configurations of the indicators.

In a normal operating condition, for example, when the server tray 201 is plugged into the server rack, the indicator 212 is powered by the external power supply unit 250. When the server tray 201 is plugged off from the server rack for service or replacement, the power switch module 222 can detect such a power loss event and switch the power source of the indicator 212 to the power supply unit 220 to uninterruptedly supply power to other components of the computer system 200 including the indicator 212 and the signal latch module 223 using the power storage module 221. In some embodiments, the power switch module 222 can receive a power loss signal from an external sensor as shown as a system power-off signal 224. Alternatively, the computer system 200 may include an internal sensor to generate the system power-off signal 224 that is fed to the power switch module 222.

The computer system 200 further includes a signal latch module 223 that is configured to latch the indicator 212 in response to the system power-off signal 224. When the server tray 201 is plugged into the server rack, the controller 215 provides a signal to the indicator 212 to indicate status information (e.g., failure) of the computer system 200. Even when the system loses power or the server tray 201 is plugged off from the server rack and the main power connection is disconnected from the external power supply unit 250, as is indicated by the system power off signal 224, the signal latch module 223 is powered by the power supply unit 220 and latches the signal generated by the controller 215 to uninterruptedly indicate status information (e.g., failure) of the computer system 200. The latch of the signal in response to the system power off signal 224 may deterministically provide the signal indicating the status information of the computer system when the system loses power or the server tray 201 is plugged off from the server rack and the main power connection is disconnected from the external power supply unit 250. Without the latching the signal, the signal generated from the controller 215 may be lost because the controller 215 may lose its power when the power supply to the controller 215 is cut off. Using the latched signal from the signal latch module 223, the indicator 212 continues to be powered by the power supply unit 220 to indicate the status information associated with the computer system 200.

In one embodiment, the system power-off signal 224 may be externally received from a sensor attached to the server rack or the external power supply unit 250. In another embodiment, the system power-off signal 224 may be internally generated within the computer system 200. For example, the power supply unit 220 that is internal to the computer system 200 may detect a loss of power received from the external power supply unit 250 to trigger the system power off signal 224.

Although FIG. 2 shows that the controller 215 and the data storage device 216 receive power directly from the external power supply unit 250, it is understood that the controller 215 and the data storage device 216 can receive power from the power supply unit 220. In one embodiment, the power supply unit 220 may have a sufficient power capacity that is enough only to supply power to the indicator 212 and the signal latch module 223 for a limited time to allow the technician or the administrator to properly diagnosis the failure mode of the computer system or the data storage device(s) 216 and replace it when necessary.

According to one embodiment, the external power supply unit 250 can include a rack power distribution unit that is configured to distribute electrical power to various components in a server rack. The rack power distribution unit may include various components and elements, including wiring, bus bars, connectors, and circuit breakers. One or more rack power distribution units may be coupled in the server rack one or more sides of the server rack. The rack power distribution units may supply power to the computer systems in the server rack.

Figure 3:
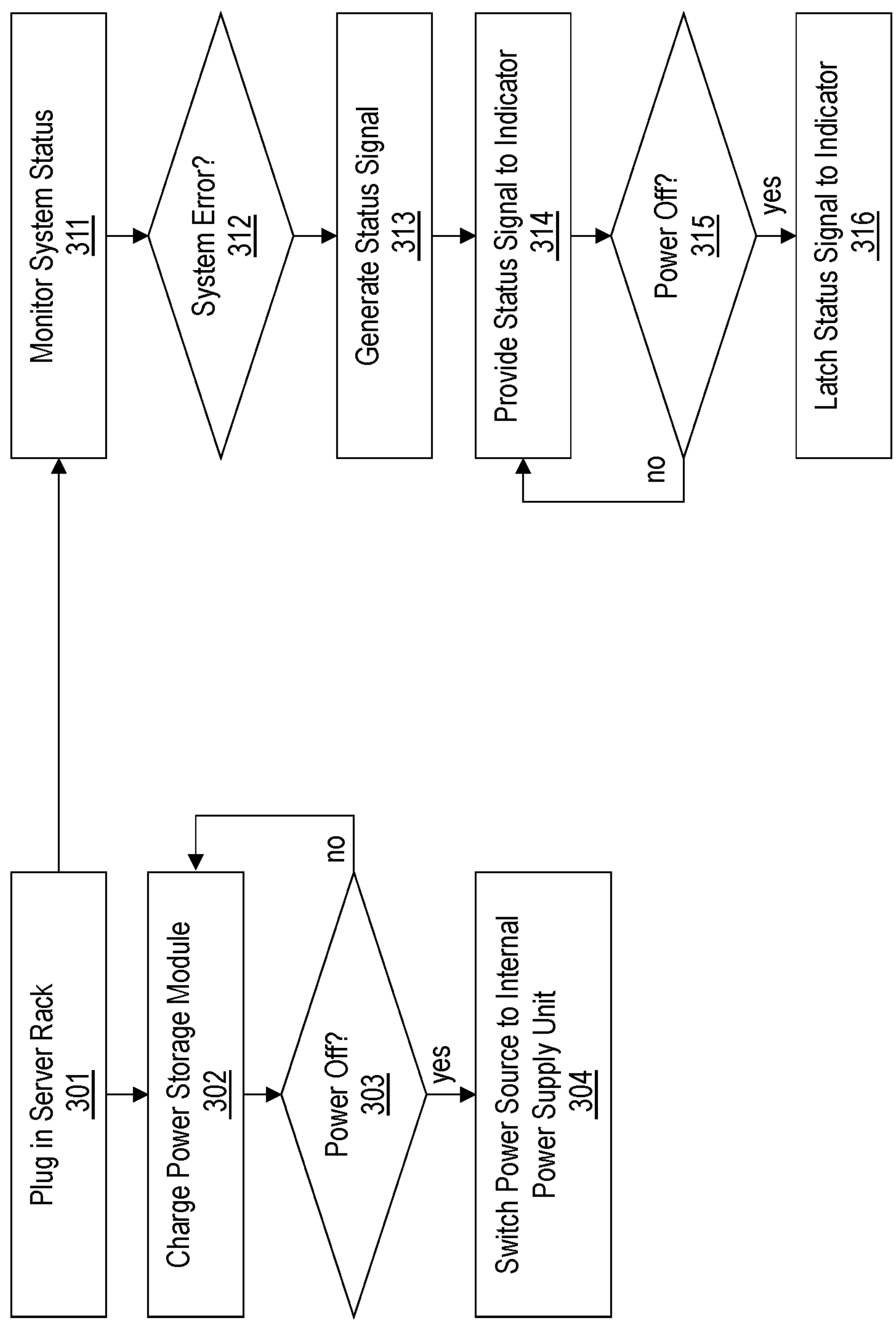
FIG. 3 is a flowchart of an example process for indicating status information of a computer system, according to one embodiment.

FIG. 3 is a flowchart of an example process for indicating status information of a computer system, according to one embodiment. In one embodiment, the computer system is a rack-mountable computer system. The computer system is plugged into a server rack and is powered by an external power supply unit of the server rack (301). While the computer system is plugged into the server rack, the power storage module of the power supply unit included in the computer system is charged (302). The power storage module may include an independent power storage medium such as a super capacitor or a battery. The sizing and capacity of the super capacitor or the battery may be determined based on power consumption of an indicator and a signal latch module, and a desired duration of power supply to the indicator and signal latch module when the system power is lost.

The controller of the computer system monitors the system status (311). When a system error is detected, for example, an error or a failure of a data storage device (312), the controller generates a status signal (313), and provides the status signal to the indicator (314). While the computer system is powered by the external power supply unit, the controller may continue to monitor the system status and change the status signal provided to the indicator.

When the system power is lost, for example, the external power supply unit is down or the server tray of the computer system is removed from the server rack (303 and 315), the power switch module of the power supply unit detects a power loss event and es the power source of the indicator and the signal latch module included in the computer system from the external power supply unit to the internal power supply unit of the computer system. Using the reserve power of the internal power supply unit, the signal latch module latches the status signal generated or triggered by the internal controller of the computer system to allow the indicator to continue to show the status of the computer system after the system power is lost. Contrary to a conventional uninterruptable power supply that powers the entire computer system to allow the computer system to backup data or safely shut down, the present computer system has the internal power supply unit that is configured and sized enough to power the signal latch module and the indicator in an event of a power loss to continue to uninterruptedly show the status of the computer system itself.

Although the present example shows an implementation in a rack-mountable computer system, it is noted that the present system and method can be applied to a data server or any other computer system that requires an indicator to show status information.

According to one embodiment, a rack-mountable computer system includes: a power supply unit comprising a power storage module and a power switch module; a controller configured to generate a signal indicating status information of the rack-mountable computer system; an indicator configured to indicate the status information of the rack-mountable computer system; and a signal latch module. The power supply unit switches a power supply of the indicator from the external power supply unit to the power supply unit in a power loss event when the rack-mountable computer system is detached from a rack or a system power of the rack is lost from an external power supply unit and supplies power to the indicator after the power loss event occurs. The signal latch module is configured to latch the signal that is generated by the controller and indicates the status information of the rack-mountable computer system in response to the power loss event.

The power supply unit may switch a power supply of the signal latch module from the external power supply unit to the power supply unit in response to the power loss event.

The power off signal may be received from an external power supply unit.

The power off signal may be generated by the power supply unit.

The power storage module may include a super capacitor or a battery.

The power switch module may be configured to switch a power source of the indicator from an external power supply to the power supply unit when the external power supply is lost.

The indicator may include one or more light emitting diodes (LEDs).

The rack-mountable computer system may further include one or more data storage devices.

The indicator may be configured to indicate the status information of the one or more data storage devices.

The controller may be a baseboard management controller (BMC) of the rack-mountable computer system.

According to another embodiment, a method includes: providing an internal power supply unit of a computer system; detecting a power loss event of the computer system the computer system is detached from a rack or a system power of the rack is lost from an external power supply unit; switching a power supply of an indicator from the external power supply unit to the internal power supply unit and latching a status signal generated by a controller of the computer system after the power loss event occurs.

The power loss may occur when the computer system is detached from a rack or a system power of the rack is lost.

The method may further include receiving a power off signal from an external power supply unit associated with the rack.

The method may further include generating a power off signal using the internal power supply unit.

The internal power supply unit may include a power storage module.

The power storage module may include a super capacitor or a battery.

The indicator may include one or more light emitting diodes (LEDs).

The computer system may further include one or more data storage devices.

The indicator may be configured to indicate the status information of the one or more data storage devices.

The controller may be a baseboard management controller (BMC) of the computer system.

The above example embodiments have been described hereinabove to illustrate various embodiments of implementing a system and method for providing a self-powered indicator for indicating status information of the computer system. Various modifications and departures from the disclosed example embodiments will occur to those having ordinary skill in the art. The subject matter that is intended to be within the scope of the invention is set forth in the following claims.

What is claimed is:

1. A system comprising:

a controller configured to generate status information of the system;

an indicator configured to indicate the status information of the system;

a power storage device coupled to the indicator; and a signal latch device coupled between the controller and the indicator and configured to provide a latched signal indicating the status information generated by the controller, wherein, in a power loss event, a power supply of the indicator is routed from an external power supply to the power storage device, wherein the indicator is configured to indicate the status information of the system in the power loss event using the latched signal based on the signal latch device receiving a power off signal from an external module connected to the external power supply, wherein the latched signal maintains the status information of the system in the power loss event, and wherein the external module and the external power supply are external to the system.

2. The system of claim 1, wherein the external power supply provides the power off signal to trigger the power loss event.

3. The system of claim 1, wherein the power storage device generates the power off signal to trigger the power loss event.

4. The system of claim 1, wherein the power storage device comprises a super capacitor.

5. The system of claim 1, wherein the power storage device supplies power to the controller in the power loss event.

6. The system of claim 1, wherein the controller comprises a baseboard management controller (BMC) associated with the system.

7. The system of claim 1, wherein the indicator maintains the status information of the system in the power loss event.

8. The system of claim 1, further comprising one or more data storage devices, wherein the indicator indicates second status information associated with the one or more data storage devices.

9. The system of claim 8, wherein the indicator simultaneously indicates the status information of the system and the second status information associated with the one or more data storage devices.

10. A method comprising:

providing an internal power storage device of a system;

indicating status information of the system using an indicator coupled to a controller configured to generate the status information of the system;

detecting a power loss event;

routing a power supply of the indicator from an external power supply to the internal power storage device coupled to the indicator; and indicating the status information of the system using the indicator in the power loss event using a latched signal based on a signal latch device receiving a power off signal from an external module connected to the external power supply, the signal latch device being coupled between the controller and the indicator and configured to provide the latched signal indicating the status information generated by the controller, wherein the latched signal maintains the status information of the system in the power loss event, and wherein the external module and the external power supply are external to the system.

11. The method of claim 10, further comprising receiving the power off signal from the external power supply to trigger the power loss event.

12. The method of claim 10, further comprising receiving the power off signal from the internal power storage device to trigger the power loss event.

13. The method of claim 10, wherein the internal power storage device comprises a super capacitor.

14. The method of claim 10, wherein the system comprises the controller that generates the status information of the system.

15. The method of claim 14, wherein the internal power storage device supplies power to the controller in the power loss event.

16. The method of claim 14, wherein the indicator maintains the status information of the system in the power loss event.

17. The method of claim 10, wherein the system further includes one or more data storage devices, and wherein the indicator indicates second status information associated with the one or more data storage devices.

18. The method of claim 17, wherein the indicator simultaneously indicates the status information of the system and the second status information associated with the one or more data storage devices.

* * * * *